(12) United States Patent
Morikawa et al.

(10) Patent No.: US 8,367,252 B2
(45) Date of Patent: Feb. 5, 2013

(54) NON-AQUEOUS ELECTROLYTE SECONDARY BATTERY

(75) Inventors: Takaharu Morikawa, Osaka (JP); Atsushi Ueda, Osaka (JP); Takafumi Oura, Osaka (JP); Shinichi Kinoshita, Chiba (JP); Minoru Kotato, Ibaraki (JP); Hideharu Satou, Ibaraki (JP); Hitoshi Matsumoto, Kagawa (JP)

(73) Assignees: Panasonic Corporation, Osaka (JP); Mitsubishi Chemical Corporation, Tokyo (JP)

( * ) Notice: Subject to any disclaimer, the term of this patent is extended or adjusted under 35 U.S.C. 154(b) by 455 days.

(21) Appl. No.: 12/161,474

(22) PCT Filed: Feb. 23, 2007

(86) PCT No.: PCT/JP2007/053418
§ 371 (c)(1),
(2), (4) Date: Jul. 18, 2008

(87) PCT Pub. No.: WO2007/099877
PCT Pub. Date: Sep. 7, 2007

(65) Prior Publication Data
US 2010/0227218 A1 Sep. 9, 2010

(30) Foreign Application Priority Data
Feb. 28, 2006 (JP) .................. 2006-053563

(51) Int. Cl.
*H01M 10/40* (2006.01)
*H01M 6/14* (2006.01)

(52) U.S. Cl. ............ 429/324; 429/188; 429/231.4; 429/326; 429/330

(58) Field of Classification Search ............ 429/188, 429/231.4, 324, 326
See application file for complete search history.

(56) References Cited

U.S. PATENT DOCUMENTS

| | | | |
|---|---|---|---|
| 6,139,989 A | | 10/2000 | Kawakubo et al. |
| 6,632,569 B1* | | 10/2003 | Kameda et al. ............ 429/231.8 |
| 2001/0018146 A1 | | 8/2001 | Shin et al. |
| 2002/0017632 A1* | | 2/2002 | Nakamura et al. ......... 252/299.2 |
| 2002/0127472 A1 | | 9/2002 | Terashima et al. |
| 2002/0168576 A1 | | 11/2002 | Hamamoto et al. |
| 2003/0059681 A1 | | 3/2003 | Noh |
| 2003/0129499 A1 | | 7/2003 | Choy et al. |
| 2003/0147800 A1* | | 8/2003 | Kwon et al. ............... 423/445 R |
| 2003/0180626 A1* | | 9/2003 | Shima et al. ................. 429/326 |
| 2003/0232240 A1* | | 12/2003 | Lee et al. ..................... 429/122 |
| 2005/0095503 A1* | | 5/2005 | Adachi et al. ................ 429/188 |
| 2005/0164094 A1 | | 7/2005 | Kotato et al. |
| 2005/0203240 A1 | | 9/2005 | Maleki et al. |
| 2007/0048607 A1* | | 3/2007 | Nakashima et al. ......... 429/209 |

FOREIGN PATENT DOCUMENTS

| | | | |
|---|---|---|---|
| JP | 8-227714 | | 9/1996 |
| JP | 9-106835 | | 4/1997 |
| JP | 10-228896 | | 8/1998 |
| JP | 11-204107 | | 7/1999 |
| JP | 2000-058116 | | 2/2000 |
| JP | 2003-115325 | | 4/2003 |
| JP | 2003-151625 | | 5/2003 |
| JP | 2003128405 | * | 5/2003 |
| JP | 2004256626 | * | 9/2004 |
| JP | 2006-100262 | | 4/2006 |
| WO | WO 03/012912 A1 | | 2/2003 |
| WO | WO 03/049215 A2 | | 6/2003 |
| WO | WO 2006/025319 A1 | | 3/2006 |

OTHER PUBLICATIONS

JP2003128405—Translation.*
Korean Office Action issued in Korean Patent Application No. 10-2008-7021529, mailed Aug. 2, 2010.
United States Office Action, issued in U.S. Appl. No. 11/661,682, dated Sep. 28, 2010.
United States Office Action, issued in U.S. Appl. No. 11/661,682, dated Jan. 26, 2011.
United States Office Action, issued in U.S. Appl. No. 11/661,682, dated Jul. 26, 2011.

* cited by examiner

*Primary Examiner* — Patrick Ryan
*Assistant Examiner* — Ladan Mohaddes
(74) *Attorney, Agent, or Firm* — McDermott Will & Emery LLP (57) ABSTRACT

A non-aqueous electrolyte secondary battery wherein the non-aqueous electrolyte contains a non-aqueous solvent, a solute dissolved in the non-aqueous solvent, and hydrogenated terphenyl, the solute includes a boron-containing alkali salt and a boron-free alkali salt, the negative electrode includes a negative electrode active material comprising a randomly oriented carbon composite (A), and the carbon composite (A) contains a graphitic carbon substance (B) and a carbon substance (C) that is different from the graphitic carbon substance (B).

13 Claims, 1 Drawing Sheet

FIG. 1

NON-AQUEOUS ELECTROLYTE SECONDARY BATTERY

RELATED APPLICATIONS

This application is the U.S. National Phase under 35 U.S.C. §37\1 of International Application No. PCT/JP2007/053418, filed on Feb. 23, 2007, which in turn claims the benefit of Japanese Application No. 2006-053563, filed on Feb. 28, 2006, the disclosures of which Applications are incorporated by reference herein.

TECHNICAL FIELD

The present invention relates to a non-aqueous electrolyte secondary battery with excellent reliability. The non-aqueous electrolyte secondary battery of the present invention has excellent storage and charge/discharge cycle characteristics even under a harsh temperature condition and also has excellent safety when overcharged.

BACKGROUND ART

When a non-aqueous electrolyte secondary battery is overcharged, excessive lithium is released from the positive electrode, and the thermal stability of the positive electrode lowers. The lithium released from the positive electrode is storaged by the negative electrode. However, if excessive lithium is released from the positive electrode, lithium deposits on the surface of the negative electrode. In this case, the thermal stability of the negative electrode lowers significantly as the positive electrode. Eventually, the battery overheats and the safety degrades.

To address this problem, there has been proposed the addition of a small amount of biphenyl, which is an aromatic compound, to the non-aqueous electrolyte of a battery (see Patent Document 1). There has also been proposed the addition of terphenyl and terphenyl having an arkyl group to the non-aqueous electrolyte (see Patent Document 2). These compounds polymerize when the battery is overcharged. As a result, the pores of the separator become clogged, so that the internal resistance of the battery rises and the safety improves.

However, biphenyl, terphenyl, and terphenyl having an alkyl group are solid and have a low solubility in non-aqueous solvents. Thus, at low temperatures, part of these compounds deposit, thereby resulting in degradation of battery performance. Also, these compounds have low oxidation potentials, and at high temperatures, they react with a positive electrode material during storage and charge/discharge cycles, thereby resulting in degradation of battery performance.

Further, in order to ensure safety of an overcharged battery without adversely affecting low temperature characteristics and storage characteristics, there has also been proposed the addition of a small amount of hydrogenated terphenyl to the non-aqueous electrolyte (see Patent Document 3).

Patent Document 1: Japanese Laid-Open Patent Publication No. Hei 9-106835
Patent Document 2: Japanese Laid-Open Patent Publication No. 2000-058116
Patent Document 3: Japanese Laid-Open Patent Publication No. 2003-115325

DISCLOSURE OF THE INVENTION

Problem to be Solved by the Invention

Non-aqueous electrolyte secondary batteries are required to provide higher performance, and this requirement is gradually becoming severe. However, under a harsh temperature environment, it is difficult to suppress degradation of storage characteristics and charge/discharge cycle characteristics.

In view of the above, it is an object of the present invention to provide a highly reliable non-aqueous electrolyte secondary battery capable of maintaining good storage and charge/discharge cycle characteristics even under a more harsh temperature environment than conventional one and having excellent safety when overcharged.

Means for Solving the Problem

The present invention relates to a non-aqueous electrolyte secondary battery including a positive electrode, a negative electrode, and a non-aqueous electrolyte. The non-aqueous electrolyte includes a non-aqueous solvent, a solute dissolved in the non-aqueous solvent, and hydrogenated terphenyl. The solute includes a boron-containing alkali salt and a boron-free alkali salt. The negative electrode includes a negative electrode active material comprising a randomly oriented carbon composite (A). The carbon composite contains a graphitic carbon substance (B) and a carbon substance (C) that is different from the graphitic carbon substance (B).

The graphitic carbon substance (B) is preferably a product obtainable by applying a heat treatment, for example, to a spherical natural graphite. The temperature of the heat treatment of the spherical natural graphite is preferably 400 to 3400° C. The content of the graphitic carbon substance (B) in the carbon composite is preferably 5% by mass or more and 99.9% by mass or less. The heat treatment of the spherical natural graphite is thought to promote the recrystallization of the spherical natural graphite, thereby repairing the distortion of the crystal lattice, as a result of which, for example, an increase in reversible capacity can be expected.

The carbon substance (C) is preferably a product obtainable by applying a heat treatment, for example, to a non-graphitic organic material. The temperature of the heat treatment of the non-graphitic organic material is preferably 650 to 3400° C. The content of the carbon substance (C) in the carbon composite is preferably 0.1% by mass or more.

The tap density of the carbon composite is preferably 1.0 g/cm$^3$ or more. The specific surface area of the carbon composite is preferably 1.2 m$^2$/g or more and 6 m$^2$/g or less. The volume basis mean particle size of the carbon composite is preferably 10 μm or more and 30 μm or less.

It is particularly preferable that the non-aqueous electrolyte contain 0.5% by mass to 3.5% by mass of the hydrogenated terphenyl and 0.1% by mass to 0.5% by mass of the boron-containing alkali salt.

It is preferable that the non-aqueous electrolyte further contain 0.1% by mass to 1% by mass of diphenyl ether.

Effects of the Invention

The non-aqueous electrolyte secondary battery of the present invention has excellent safety when overcharged since the non-aqueous electrolyte contains hydrogenated terphenyl and a boron-containing alkali salt. This effect can be obtained by oxidative polymerization of the hydrogenated terphenyl contained in the non-aqueous electrolyte during the overcharge of the battery. Due to the oxidative polymerization of the hydrogenated terphenyl, the internal resistance of the battery rises and the battery is protected.

However, hydrogenated terphenyl has a lower oxidation potential than the other electrolyte components, and easily reacts with a positive electrode material that is in the charged state. Hence, when the non-aqueous electrolyte does not contain any boron-containing alkali salt, part of the hydrogenated terphenyl reacts during high-temperature storage or charge/discharge cycles, so that the battery performance lowers.

Contrary to this, when the non-aqueous electrolyte contains a boron-containing alkali salt, the boron-containing alkali salt forms a stable protective film on the surface of the positive electrode. Thus, the oxidative reaction of the hydrogenated terphenyl is suppressed.

Further, diphenyl ether is capable of protecting the positive electrode and enhancing the safety due to polymerization reaction during overcharge. The synergistic effects of the hydrogenated terphenyl, boron-containing alkali salt, and diphenyl ether are thought to further enhance the charge/discharge cycle characteristics at high temperatures, storage characteristics at high temperatures, and safety during overcharge.

Also, the non-aqueous electrolyte secondary battery of the present invention includes a negative electrode active material comprising a randomly oriented carbon composite. This provides good storage and charge/discharge cycle characteristics even in a more harsh temperature condition than conventional one. The randomly oriented carbon composite is believed to have a very low reactivity with the electrolyte since destruction of the particle structure inside the electrode plate is suppressed. The reason of the suppressed destruction of the particle structure is, for example, that the expansion of the particles during charge is reduced in the three-dimensional directions.

When common graphite is used in place of the randomly oriented carbon composite, the storage characteristics and charge/discharge cycle characteristics degrade in a more harsh temperature condition than conventional one. In a harsh temperature condition, suppressing the decomposition of the non-aqueous electrolyte by graphite is considered difficult.

In particular, when the negative electrode density is high, the basal planes of graphite become oriented, so that the charge/discharge cycle characteristics tend to degrade significantly. Also, in the case of a high density battery in which the amount of non-aqueous electrolyte in the battery is small, the charge/discharge cycle characteristics also tend to degrade significantly since the electrolyte tends to become locally depleted. Contrary to this, a randomly oriented carbon composite is not believed to promote the decomposition of the non-aqueous electrolyte so much even in a harsh temperature condition. Thus, even when the amount of non-aqueous electrolyte is small, local depletion of the electrolyte is unlikely to occur. Also, even when the negative electrode density is high, the orientation of the crystal layer of the randomly oriented carbon composite is thought to be suppressed. Further, the randomly oriented carbon composite (A) has a shape derived from its constituent materials, namely the graphitic carbon substance (B) and the carbon substance (C) different therefrom. Hence, the local and uneven reaction of the randomly oriented carbon composite (A) with the electrolyte is suppressed.

The shape of the randomly oriented carbon composite (A) is, for example, a shape of a plurality of spherical graphite particles (graphitic carbon substance (B)) joined together by the carbon substance (C), or a shape of spherical graphite particles originating from the graphitic carbon substance (B) and indefinite-shape particles originating from the carbon substance (C) which are partially joined together.

Accordingly, the present invention can provide a non-aqueous electrolyte secondary battery having excellent storage and charge/discharge cycle characteristics in a more harsh temperature condition than conventional one and having excellent safety when overcharged.

BEST MODE FOR CARRYING OUT THE INVENTION

The non-aqueous electrolyte secondary battery of the present invention includes a positive electrode, a negative electrode, and a non-aqueous electrolyte, and the non-aqueous electrolyte includes a non-aqueous solvent, a solute dissolved in the non-aqueous solvent, and hydrogenated terphenyl. Also, the solute includes a boron-containing alkali salt and a boron-free alkali salt.

The hydrogenated terphenyl may be a pure substance composed singly of one compound or a mixture of a plurality of compounds. For example, the hydrogenated terphenyl may be a mixture of two or more kinds of partially hydrogenated substances having different hydrogenation rates. Also, the hydrogenated terphenyl may be a mixture of two or more kinds of structural isomers having the same hydrogenation rate but having hydrogenated double bonds at different positions.

As used herein, the hydrogenation rate refers to the ratio of the amount of actually added hydrogen to the amount of hydrogen necessary for adding hydrogen to all the double bonds of terphenyl.

Examples of hydrogenated terphenyl which can be used include the following:

(i) a mixture of not-hydrogenated terphenyl and completely-hydrogenated terphenyl;

(ii) a mixture of not-hydrogenated terphenyl and incompletely-hydrogenated terphenyl;

(iii) a mixture of incompletely-hydrogenated terphenyl and completely-hydrogenated terphenyl;

(iv) a mixture of not-hydrogenated terphenyl, incompletely-hydrogenated terphenyl, and completely-hydrogenated terphenyl.

As used herein, incompletely-hydrogenated terphenyl refers to a compound in which hydrogen is added to part of the double bonds of the benzene rings of o-terphenyl, m-terphenyl, or p-terphenyl. Among them, hydrogenated o-terphenyl and hydrogenated m-terphenyl are preferable since their characteristics are less susceptible to deterioration when they are subjected to high temperature cycles and a storage test. In particular, hydrogenated m-terphenyl is preferable. Also, hydrogenated o-terphenyl, hydrogenated m-terphenyl, and hydrogenated p-terphenyl may be mixed together in any combination or ratio. For example, the use of a mixture of hydrogenated m-terphenyl and hydrogenated o-terphenyl or a mixture of hydrogenated m-terphenyl and hydrogenated p-terphenyl is preferable.

As used herein, completely-hydrogenated terphenyl refers to a compound in which hydrogen is added to all the double bonds of the benzene rings of o-terphenyl, m-terphenyl or p-terphenyl.

When the hydrogenated terphenyl contains not-hydrogenated terphenyl, the ratio of the not-hydrogenated terphenyl is preferably equal to or less than 10% by mass of the whole hydrogenated terphenyl.

The hydrogenation rate of the hydrogenated terphenyl is desirably in the range of 50% to 70%, provided that the hydrogenation rate of terphenyl in which hydrogen is added to all the double bonds is defined as 100%. The hydrogenation rate may be less than 50%; however, the lower the hydrogenation rate, the lower the oxidation potential, so that reaction is more likely to occur when the battery is subjected to a high-temperature storage or charge/discharge cycles. Also, the hydrogenation rate may be greater than 70%, but the effect of enhancing safety during overcharge lowers gradually.

The content of the hydrogenated terphenyl in the non-aqueous electrolyte is preferably 0.5% by mass to 3.5% by mass, more preferably 0.8% by mass to 2.5% by mass, and most preferably 1% by mass to 1.5% by mass. If the content of the hydrogenated terphenyl is less than 0.5% by mass, the effect of ensuring safety during overcharge decreases. If it exceeds 3.5% by mass, the charge/discharge cycle characteristics may lower.

It is preferable that the non-aqueous electrolyte further contain diphenyl ether (DPE). When diphenyl ether alone is added to the non-aqueous electrolyte, it is not effective in enhancing safety during overcharge, etc. However, the addition of diphenyl ether in combination with hydrogenated terphenyl and a boron-containing alkali salt to the non-aqueous electrolyte can produce a large effect. Such a synergistic effect can be obtained probably because during overcharge, diphenyl ether and hydrogenated terphenyl form a composite polymer, thereby significantly increasing the internal resistance of the battery. That is, the effect of enhancing safety during overcharge increases and the charge/discharge cycle characteristics at high temperatures and storage characteristics at high temperatures are improved.

The content of diphenyl ether (DPE) in the non-aqueous electrolyte is preferably 0.1% by mass to 1% by mass, and more preferably 0.2% by mass to 0.8% by mass. In other words, 0.1% by mass to 1% by mass of the whole non-aqueous electrolyte is preferably diphenyl ether, and 0.2% by mass to 0.8% by mass is more preferably diphenyl ether. If the content of diphenyl ether is less than 0.1% by mass, it is almost ineffective in further enhancing the battery safety, etc. If the content of diphenyl ether exceeds 1% by mass, the capacity recovery rate of the battery stored at high temperatures may become low.

The non-aqueous solvent is not particularly limited, and usable examples include cyclic carbonates having no C=C unsaturated bond, chain carbonates having no C=C unsaturated bond, cyclic carboxylic acid esters, chain carboxylic acid esters, ethers (excluding DPE), nitriles, and amides.

Examples of cyclic carbonates having no C=C unsaturated bond include ethylene carbonate (EC), propylene carbonate (PC), and butylene carbonate (BC). In terms of the dissociation of a solute, it is desirable to use at least one selected from the group consisting of ethylene carbonate and propylene carbonate as the cyclic carbonate having no C=C unsaturated bond.

Examples of chain carbonates having no C=C unsaturated bond include dimethyl carbonate (DMC), diethyl carbonate (DEC), ethyl methyl carbonate (EMC) in terms of lowering the viscosity of the non-aqueous electrolyte. It is desirable to use at least one selected from the group consisting of dimethyl carbonate, diethyl carbonate, and ethyl methyl carbonate as the chain carbonate having no C=C unsaturated bond.

Examples of cyclic carboxylic acid esters include lactones such as γ-butyrolactone and γ-valerolactone.

Examples of chain carboxylic acid esters include methyl propionate, methyl pivalate, and octyl pivalate.

Examples of ethers include tetrahydrofuran, 2-methyltetrahydrofuran, 1,4-dioxane, 1,2-dimethoxyethane, 1,2-diethoxyethane, and 1,2-dibutoxy ethane.

An example of nitriles is acetonitrile, and an example of amides is dimethylformamide.

These non-aqueous solvents can be used singly or in any combination of two or more of them. However, the non-aqueous solvent preferably includes both a cyclic carbonate having no C=C unsaturated bond and a chain carbonate having no C=C unsaturated bond.

Specific examples of preferable combinations of a cyclic carbonate having no C=C unsaturated bond and a chain carbonate having no C=C unsaturated bond include combinations of: ethylene carbonate and dimethyl carbonate; ethylene carbonate and diethyl carbonate; ethylene carbonate and ethyl methyl carbonate; ethylene carbonate, dimethyl carbonate, and diethyl carbonate; ethylene carbonate, dimethyl carbonate, and ethyl methyl carbonate; ethylene carbonate, diethyl carbonate, and ethyl methyl carbonate; and ethylene carbonate, dimethyl carbonate, diethyl carbonate, and ethyl methyl carbonate.

Such a combination of ethylene carbonate and a chain carbonate having no C=C unsaturated bond plus propylene carbonate is also preferable.

The content of the cyclic carbonate having no C=C unsaturated bond is preferably 10 to 35% by mass, and more preferably 15 to 30% by mass, relative to the total of the cyclic carbonate having no C=C unsaturated bond and the chain carbonate having no C=C unsaturated bond. Also, the total of the cyclic carbonate having no C=C unsaturated bond and the chain carbonate having no C=C unsaturated bond preferably accounts for 80% by mass or more, and more preferably 90% by mass or more, relative to the whole non-aqueous solvent.

The non-aqueous electrolyte of the present invention can further contain various additives. For example, it is desirable that the non-aqueous electrolyte contain at least one selected from the group consisting of a cyclic carbonate having a C=C unsaturated bond and a dicarboxylic anhydride as an additive. A cyclic carbonate having a C=C unsaturated bond and a dicarboxylic anhydride have the effect of enhancing cycle characteristics and coulombic efficiency. Among them, a cyclic carbonate having a C=C unsaturated bond is suitable.

The cyclic carbonate having a C=C unsaturated bond can be, for example, vinylene carbonate (VC), vinyl ethylene carbonate (VEC), or phenyl ethylene carbonate (PEC). The dicarboxylic anhydride can be a succinic anhydrite, maleic anhydrite, etc. In particular, the inclusion of vinylene carbonate (VC) in the non-aqueous electrolyte significantly improves cycle characteristics and high-temperature storage characteristics. This is probably related to the fact that the non-aqueous electrolyte includes a boron-containing alkali salt.

In addition to the above additives, it is also possible, in terms of enhancing storage characteristics, to use a sulfurous acid ester such as ethylene sulfite, diethyl sulfite, propylene sulfite, dipropyl sulfite, or dimethyl sulfite, a sulfonic acid ester such as propane sultone, butane sultone, methyl methanesulfonate, or methyl toluenesulfonate, a sulfuric acid ester such as dimethyl sulfate, ethylene sulfate, or diethyl sulfate, a sulfone such as sulfolane, dimethyl sulfone, or diethyl sulfone, a sulfoxide such as dimethyl sulfoxide, diethyl sulfoxide, or tetramethylene sulfoxide, a sulfide such as diphenyl sulfide or thio anisole, a disulfide such as diphenyl disulfide or dipyridinium disulfide, etc. Also, in terms of improving low temperature characteristics, it is also possible to use a fluorine-containing aryl compound such as fluorobenzene as the additive.

Moreover, in terms of further enhancing safety during overcharge, it is also possible to use a fluorine-containing anisole compound such as 2,4-difluoroanisole or 3,5-difluoroanisole as the additive.

These additives can be used singly or in combination of two or more of them. In particular, the combined use of vinylene carbonate and vinyl ethylene carbonate, or the combined use of vinylene carbonate and a dicarboxylic anhydride is preferable since it allows an improvement in cycle characteristics.

The content of additives in the non-aqueous electrolyte is preferably 0.001% by mass to 10% by mass, more preferably 0.1% by mass to 5% by mass, and most preferably 0.5% by mass to 3% by mass. In other words, 0.001% by mass to 10% by mass of the whole non-aqueous electrolyte is preferably additives, 0.1% by mass to 5% by mass is more preferably additives, and 0.5% by mass to 3% by mass is most preferably additives.

A boron-containing alkali salt and a boron-free alkali salt are dissolved as solutes in the non-aqueous solvent. The boron-containing alkali salt suppresses oxidative polymerization of hydrogenated terphenyl during high-temperature storage or charge/discharge cycles. The boron-free alkali salt serves to ensure that the non-aqueous electrolyte has sufficient ionic conductivity.

Examples of boron-containing alkali salts include $LiBF_4$, $NaBF_4$, and $KBF_4$, and $LiBF_4$ is preferable. They can be used singly or in combination of two or more of them.

The content of the boron-containing alkali salt in the non-aqueous electrolyte is preferably 0.1% by mass to 0.5% by mass, and more preferably 0.15% by mass to 0.35% by mass. If the content of the boron-containing alkali salt is less than 0.1% by mass, the effect of enhancing storage or other characteristics may not be sufficient. If it exceeds 0.5% by mass, the cycle characteristics may degrade.

The boron-free alkali salt is desirably a lithium salt having an anion with a strong electron-inducing property. Usable examples include $LiPF_6$, $LiClO_4$, $LiAsF_6$, $LiCF_3SO_3$, $LiN(SO_2CF_3)_2$, $LiN(SO_2C_2F_5)_2$, and $LiC(SO_2CF_3)_3$, and $LiPF_6$ is preferable. They can be used singly or in combination of two or more of them. The concentration of the boron-free alkali salt in the non-aqueous electrolyte is preferably 0.5 M to 3 M (mol/liter), and more preferably 0.5 M to 1.5 M.

The negative electrode includes a negative electrode active material comprising a randomly oriented carbon composite (A), and the carbon composite contains a graphitic carbon substance (B) and a carbon substance (C) different from the graphitic carbon substance (B).

The carbon composite (A) can be, for example, a simple mixture of the graphitic carbon substance (B) and the carbon substance (C). The physical form of the graphitic carbon substance (B) and the carbon substance (C) contained in the carbon composite (A) is not particularly limited. For example, the graphitic carbon substance (B) and the carbon substance (C) may be integrally combined together to form composite particles. Such a composite particle has, for example, a core containing the graphitic carbon substance (B) and a coating layer containing the carbon substance (C) and covering at least a part of the surface of the core. Also, a mixture of such composite particles and particles composed simply of the graphitic carbon substance (B) and/or particles composed simply of the carbon substance (C) may also be used.

As used herein, "randomly oriented" refers to random orientation of the crystal layer of carbon. The carbon composite (A) is a composite material of two kinds of carbon substances, so the orientation of its crystal layer is random. For example, by observing a cross section of an electrode plate, it is possible to determine whether or not it is randomly oriented.

The graphitic carbon substance (B) is preferably a product (B') obtained by heat-treating a spherical natural graphite.

As used herein, the spherical natural graphite refers to graphite particles with a circularity of 0.85 to 1. It is particularly preferable that the particle circularity of the spherical natural graphite be 0.9 to 0.95. As the circularity of the spherical natural graphite becomes higher, the orientation of the carbon crystal layer is suppressed more effectively when the negative electrode density is heightened. Also, by heat-treating a spherical natural graphite, a graphitic carbon substance (B) having a higher volume energy density can be obtained.

Particle circularity is measured in the following manner by using, for example, a flow particle image analyzer (e.g., FPIA available from Sysmex Corporation). First, a sample of approximately 0.2 g (spherical natural graphite) is dispersed in an aqueous solution (approximately 50 mL) containing 0.2% by mass of polyoxyethylene (20) sorbitan monolaurate, which is a surfactant, and ultrasonic waves of 28 kHz are applied thereto at a power of 60 W for 1 minute. Then, with the detection range set to 0.6 to 400 μm, the average circularity of particles with particle sizes of 3 to 40 μm is measured.

The volume basis mean particle size (median diameter $D_{50}$) of the spherical natural graphite is preferably 4 to 50 μm, and more preferably 6 to 30 μm. If the mean particle size of the spherical natural graphite is too small, agglomeration tends to occur, and if it is too large, the surface of the electrode plate tends to have streaks.

The degree of graphitization of the graphitic carbon substance (B) can be evaluated based on the value d (interplanar spacing) of the lattice plane (002 plane) determined by the Gakushin XRD method. The value d of the graphitic carbon substance (B) is preferably 0.335 nm or more, preferably 0.340 nm or less, and more preferably 0.337 nm or less. If the value d exceeds 0.340 nm, such graphite has a low degree of crystallinity, so that the initial irreversible capacity may increase. The lower limit value, 0.335 nm, is the theoretical value of graphite. The crystallite (crystal grain) size (Lc) of graphite determined by the Gakushin XRD method is preferably 30 nm or more, more preferably 50 nm or more, and most preferably 80 nm or more. If Lc is smaller, such graphite has a low degree of crystallinity, so that the initial irreversible capacity may increase.

The carbon substance (C) is preferably a product (C') obtained by heat-treating a non-graphitic organic material at graphitization temperatures. The carbon substance (C) may contain, for example, amorphous carbon. The non-graphitic organic material can be, for example, a polymer, an oligomer, tar, pitch, etc. It should be noted that when a non-graphitic organic material (e.g., pitch) not subjected to a heat treatment is heated in an inert gas atmosphere such as argon gas, its weight usually decreases by 15% or more by weight, and that when the product (C') obtainable by heat treatment at graphitization temperatures is heated in an inert gas atmosphere such as argon gas, its weight usually decreases by less than 10% by weight. The graphitization temperatures are usually 2500° C. or more.

Examples of polymers which can be used include synthetic organic polymers such as polyvinyl chloride, polyvinyl alcohol, polyvinyl butyral, insolubilized materials thereof, polyacrylonitrile, polypyrrole, polythiophene, and polystyrene; polysaccharides or natural polymers such as cellulose, lignin, mannan, polygalacturonic acid, chitosan, and saccharose; thermoplastic resins such as polyphenylene sulfide and polyphenylene oxide; and thermosetting resins such as furfuryl alcohol resin, phenol formaldehyde resin, and imide resin.

Examples of oligomers which can be used include aromatic group hydrocarbons such as acenaphthylene, decacyclene, anthracene, and phenanthrene; cyclic nitrogen compounds such as phenazine and acridine; cyclic sulfur compounds such as thiophene and bithiophene; polyphenylenes such as biphenyl and terphenyl; and polymers composed of several such molecules.

While the heat treatment of the spherical natural graphite and the heat treatment of the non-graphitic organic material may be performed separately, it is preferable to perform these heat treatments at the same time after mixing the spherical natural graphite and the non-graphitic organic material. Also, the spherical natural graphite and the non-graphitic organic material heat-treated at the same time may be mixed with the product (B') and/or product (C') which are obtained by separately performing heat treatments, in order to prepare the carbon composite (A). Also, the carbon composite (A) may contain a spherical natural graphite that is not heat-treated.

The temperature of the heat treatment is preferably 400 (650° C. for the non-graphitic organic material) to 3400° C., and more preferably 900 to 3200° C. If the heating temperature is too low, the resulting product (B') has a low degree of graphitization, and the resulting products (B') and (C') contain relatively large amounts of impurities. As a result, a large amount of non-aqueous electrolyte is decomposed, thereby resulting in degradation of cycle characteristics. If the heating temperature is too high, the product sublimes, which may lead to a reduction in yields. The heat treatment is preferably performed in an inert atmosphere.

The graphitic carbon substance (B) is easily pressed; thus, in the case of obtaining a high density negative electrode, its crystal layer may become oriented. On the other hand, the carbon substance (C) is thought to suppress the orientation of the crystal layer of the graphitic carbon substance (B).

The content of the graphitic carbon substance (B) in the carbon composite is preferably 5% by mass or more and 99.9% by mass or less, and more preferably 60 to 95% by mass. If the content of the graphitic carbon substance (B) is less than 5% by mass, and the negative electrode density is high (e.g., 1.7 g/cm$^3$ or more), then the electronic conductivity inside the negative electrode may become low, thereby resulting in degradation of cycle characteristics. On the other hand, if the content of the graphitic carbon substance (B) exceeds 99.9% by mass, the crystal layer of the graphitic carbon substance (B) may become oriented, thereby resulting in degradation of cycle characteristics.

The content of the carbon substance (C) in the carbon composite is preferably 0.1% by mass or more, and more preferably 10 to 70% by mass. If the content of the carbon substance (C) is less than 0.1% by mass, the crystal layer of the graphitic carbon substance (B) may become oriented, thereby resulting in degradation of cycle characteristics. If the content of the carbon substance (C) exceeds 90% by mass, the resulting electrode plate may have a low electronic conductivity.

The tap density of the carbon composite is preferably 1.0 g/cm$^3$ or more, and more preferably 1.1 g/cm$^3$ or more. If the tap density of the carbon composite is less than 1.0 g/cm$^3$, and the negative electrode density is high (e.g., 1.7 g/cm$^3$ or more), then the ionic conductivity inside the negative electrode may become low, thereby resulting in degradation of cycle characteristics.

Tap density is measured, for example, in the following manner. First, a sample (carbon composite) is dropped to a 20 cm$^3$ tap cell through a sieve with openings of 300 μm, so that the sample is filled up to the upper end of the cell. Thereafter, using a particle density analyzer (e.g., Tap Denser available from Seishin Enterprise Co., Ltd.), 1000 taps with a stroke length of 10 mm were made, and tap density is determined from the volume and weight of the sample obtained at that time.

The specific surface area (BET specific surface area) of the carbon composite is preferably 1.2 m$^2$/g or more and 6 m$^2$/g or less, and more preferably 2 to 5.5 m$^2$/g. If the specific surface area is less than 1.2 m$^2$/g, the carbon composite may have a low charge acceptance, thereby resulting in degradation of cycle characteristics. If the specific surface area exceeds 6 m$^2$/g, the negative electrode may have low thermal stability during overcharge, thereby resulting in deterioration of safety.

The BET specific surface area is measured by using, for example, a surface area analyzer (e.g., automatic surface area analyzer available from Ohkura Riken Co., Ltd.) in the following manner. First, while supplying nitrogen, a sample is preliminarily dried at 350° C. for 15 minutes. Thereafter, using a mixed gas of nitrogen and helium which is precisely adjusted so that the pressure of the nitrogen relative to the atmospheric pressure is 0.3, BET specific surface area is measured by the nitrogen adsorption BET single-point method utilizing gas flow.

The volume basis mean particle size of the carbon composite is preferably 10 μm or more and 30 μm or less, and more preferably 13 to 25 μm. If the mean particle size is less than 10 μm, and the negative electrode density is high (e.g., 1.7 g/cm$^3$ or more), then the ionic conductivity inside the negative electrode may become low, thereby resulting in degradation of cycle characteristics. If the mean particle size exceeds 30 μm, the crystal layer of carbon may become oriented, thereby resulting in degradation of cycle characteristics.

Mean particle size is measured, for example, in the following manner. First, a carbon composite is dispersed in an aqueous solution (approximately 1 mL) containing 0.2% by mass of polyoxyethylene (20) sorbitan monolaurate, which is a surfactant. The resulting dispersion is introduced into a laser diffraction particle size distribution analyzer (e.g., LA-700 available from Horiba, Ltd.) to obtain particle size distribution. The median value in the obtained particle size distribution serves as the mean particle size.

Figure 1:
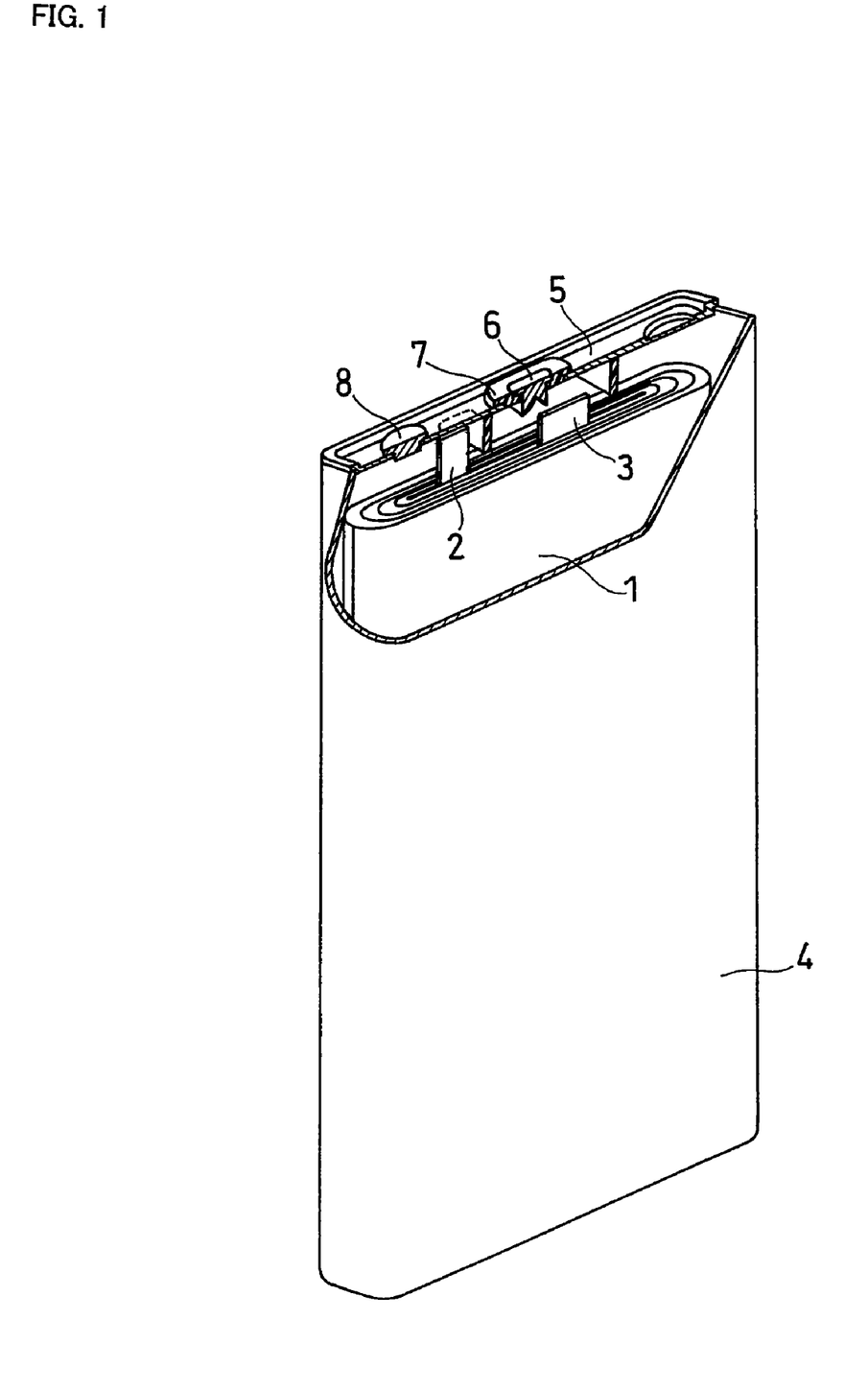
FIG. 1 is a partially cut-away perspective view of a prismatic lithium ion secondary battery in one embodiment of the present invention.

FIG. 1 is a partially cut-away perspective view of an exemplary prismatic lithium ion secondary battery.

A positive electrode and a negative electrode are wound together with a separator interposed therebetween, to form an electrode assembly 1. The electrode assembly 1 is housed in a prismatic battery case 4 with a bottom. One end of a negative electrode lead 3 is connected to the negative electrode. The other end of the negative electrode lead 3 is connected to a rivet 6 positioned in the center of a seal plate 5 through an upper insulator plate (not shown). The rivet 6 is insulated from the seal plate 5 by an insulating gasket 7. One end of a positive electrode lead 2 is connected to the positive electrode. The other end of the positive electrode lead 2 is connected to the backside of the seal plate 5 through the upper insulator plate. The lower end of the electrode assembly 1 is insulated from the battery case 4 by a lower insulator plate (not shown). The upper insulator plate insulates the negative electrode lead 3 from the battery case 4 and insulates the electrode assembly 1 from the seal plate 5.

The peripheral edge of the seal plate 5 fits with the open edge of the battery case 4, and the fitted portion is sealed by laser welding. The inlet for non-aqueous electrolyte provided in the seal plate 5 is closed with a seal stopper 8 and sealed by laser welding.

The positive electrode is prepared, for example, by applying a positive electrode mixture paste onto both faces of a positive electrode current collector, drying it, and rolling it to form positive electrode mixture layers. The positive electrode current collector is provided with an exposed area where no positive electrode mixture layer is carried, and a positive electrode lead is welded to the exposed area.

The positive electrode current collector can be a metal foil, or a lathed or etched metal sheet. The material of the positive electrode current collector is preferably aluminum or an aluminum alloy. The thickness of the positive electrode current collector is, for example, 5 μm to 60 μm.

The positive electrode mixture paste is prepared by mixing a positive electrode mixture with a liquid dispersion medium. The positive electrode mixture contains a positive electrode active material as an essential component and optional components such as a binder, a conductive agent, and a thickener.

There is no particular limitation with respect to the positive electrode active material; for example, lithium containing oxides capable of receiving lithium ions as a guest are used. For example, composite metal oxides including lithium and at least one transition metal selected from the group consisting of cobalt, manganese, nickel, chromium, iron, and vanadium are used.

Among composite metal oxides, $Li_xCoO_2$, $Li_xMnO_2$, $Li_xNiO_2$, $Li_xCrO_2$, $\alpha Li_xFeO_2$, $Li_xVO_2$, $Li_xCO_yNi_{1-y}O_2$, $Li_xCO_yM_{1-y}O_zLi_xNi_{1-y}M_yO_z$, $Li_xMn_2O_4$, $Li_xMn_{2-y}M_yO_4$ where M represents at least one selected from the group consisting of Na, Mg, Sc, Y, Mn, Fe, Co, Ni, Cu, Zn, Al, Cr, Pb, Sb, and B, x=0 to 1.2, y=0 to 0.9, and z=2.0 to 2.3, transition metal chalcogenides, lithiated vanadium oxides, lithiated niobium oxides, etc. are preferred. They may be used singly or in combination of two or more of them. It should be noted that the above value x increases/decreases due to charge/discharge. The preferable mean particle size of the positive electrode active material is 1 μm to 30 μm.

The negative electrode is prepared, for example, by applying a negative electrode mixture paste onto both faces of a negative electrode current collector, drying it, and rolling it to form negative electrode mixture layers. The negative electrode current collector is provided with an exposed area where no negative electrode mixture layer is carried, and a negative electrode lead is welded to the exposed area.

The negative electrode current collector can be a metal foil, or a lathed or etched metal sheet. The material of the negative electrode current collector is preferably copper or a copper alloy. The thickness of the negative electrode current collector is, for example, 5 μm to 50 μm.

The negative electrode mixture paste is prepared by mixing a negative electrode mixture with a liquid dispersion medium. The negative electrode mixture contains a negative electrode active material as an essential component and optional components such as a binder, a conductive agent, and a thickener.

With respect to the binder, conductive agent, and thickener that can be contained in the positive electrode mixture or negative electrode mixture, conventional materials can be used.

The binder is not particularly limited as long as it can be dissolved or dispersed in the dispersion medium of the paste. Usable examples include fluorocarbon resin, acrylic rubber, modified acrylic rubber, styrene-butadiene rubber (SBR), acrylic type polymers, and vinyl type polymers. They may be used singly or in combination of two or more of them. Preferable examples of fluorocarbon resin include polyvinylidene fluoride, copolymer of vinylidene fluoride and hexafluoropropylene, and polytetrafluoroethylene. They can be used, for example, in the form of dispersion.

As the conductive agent, for example, acetylene black, graphite, and carbon fiber can be used. They may be used singly or in combination of two or more of them.

As the thickener, for example, ethylene-vinyl alcohol copolymer, carboxymethyl cellulose, and methyl cellulose are preferable.

The dispersion medium mixed with the positive electrode mixture or negative electrode mixture is preferably one in which the binder can be dissolved or dispersed. In the case of using a binder that is dissolved or dispersed in organic solvent, N-methyl-2-pyrrolidone, N,N-dimethylformamide, tetrahydrofuran, dimethyl acetamide, dimethyl sulfoxide, hexamethylsulfonamide, tetramethyl urea, acetone, methyl ethyl ketone, etc. can be used singly or as a mixture thereof. Also, in the case of using a binder that is dissolved or dispersed in water, water or warm water is preferable.

The method for mixing the positive electrode mixture or negative electrode mixture with the dispersion medium to prepare the positive electrode mixture paste or negative electrode mixture paste is not particularly limited. For example, a planetary mixer, homomixer, pin mixer, kneader, homogenizer, etc. can be used. They can be used singly or in combination of two or more of them. Also, in kneading the paste, it is also possible to add various dispersing agents, surfactant, stabilizer, etc., if necessary.

The positive electrode mixture paste or negative electrode mixture paste can be readily applied onto the current collector by using, for example, a slit die coater, reverse roll coater, lip coater, blade coater, knife coater, gravure coater, dip coater, etc. It is preferable to dry the paste applied to the current collector in a manner similar to air drying. However, in view of productivity, it is preferable to dry it at temperatures of 70° C. to 200° C. for 10 minutes to 5 hours.

With respect to the rolling, the electrode plate is rolled with a roll press at a line pressure of 1000 to 2000 kg/cm several times until it has a predetermined thickness of, for example, 130 μm to 200 μm. Preferably, it is rolled a plurality of times at different line pressures.

The separator is preferably a microporous film made of a polymer. Usable examples of polymers include polyethylene, polypropylene, polyvinylidene fluoride, polyvinylidene chloride, polyacrylonitrile, polyacrylamide, polytetrafluoroethylene, polysulfone, polyether sulfone, polycarbonate, polyamide, polyimide, polyether (polyethylene oxide or polypropylene oxide), cellulose (carboxymethyl cellulose or hydroxypropyl cellulose), poly(meth)acrylic acid, and poly(meth)acrylic acid esters.

The microporous film may be a multilayer film composed of a plurality of layers. A microporous film made of, for example, polyethylene, polypropylene, or polyvinylidene fluoride is preferable. The preferable thickness of the separator is, for example, 10 μm to 30 μm.

The present invention is hereinafter described specifically by way of Examples and Comparative Examples. These Examples, however, are merely illustrative of the present invention and not to be construed as limiting the present invention.

Example 1

(i) Preparation of Positive Electrode

A positive electrode mixture paste was prepared by blending $LiCoO_2$ (mean particle size 10 μM) serving as a positive electrode active material, carbon black as a conductive agent, and polyvinylidene fluoride (PVdF) as a binder in a mass ratio of 100:3:4 and kneading it with a suitable amount of N-methyl-2-pyrrolidone (NMP).

The positive electrode mixture paste was applied onto both faces of a positive electrode current collector made of a 15-μm thick aluminum foil by the doctor blade method, so that the total thickness (the total thickness of the current collector and the two positive electrode mixture layers on both faces thereof) after the drying was approximately 250 μm. The electrode plate was then pressed so that the total thickness was 150 μm and the positive electrode density was 3.5 g/cm³. The resulting electrode plate was cut to predetermined dimensions to obtain a positive electrode. A positive electrode lead made of aluminum was welded to the positive electrode.

(ii) Preparation of Negative Electrode

A carbon composite serving as a negative electrode active material was prepared in the following manner.

A randomly oriented carbon composite (A) was prepared by mixing 95 parts by weight of a spherical natural graphite with a mean particle size of 19 μm and a particle circularity of 0.92 with a non-graphitic organic material (which refers to pitch hereinafter) that would become 5 parts by weight after being heat-treated, and heating the mixture at 3000° C. in an inert gas atmosphere for 168 hours or more.

Table 1 shows the tap density, specific surface area, and mean particle size of the carbon composite measured in the above-described methods, the blend ratio of graphitic carbon substance (B) to carbon substance (C), and the heat-treatment condition.

The carbon composite obtained was blended with a styrene butadiene rubber binder in a mass ratio of 100:5, and then kneaded with a suitable amount of water to obtain a negative electrode mixture paste.

The negative electrode mixture paste was applied onto both faces of a negative electrode current collector made of a 20-μm thick copper foil by the doctor blade method, so that the total thickness (the total thickness of the current collector and the two negative electrode mixture layers on both faces thereof) after the drying was approximately 240 μm. The electrode plate was then rolled so that the total thickness was 145 μm and the negative electrode density was 1.7 g/cm³. The resulting electrode plate was cut to predetermined dimensions to obtain a negative electrode. A negative electrode lead made of nickel was welded to the negative electrode.

(iii) Fabrication of Electrode Assembly

An electrode assembly was fabricated by winding the positive electrode and the negative electrode prepared in the above manner so as to have a substantially oval cross-section, with a 20-μm thick microporous polyethylene film interposed therebetween. This electrode assembly was pressed into a flat shape from the longer side of the cross-section at a pressure of 0.4 MPa for 1.5 seconds.

(iv) Preparation of Non-Aqueous Electrolyte

A solvent mixture containing ethylene carbonate (EC)(cyclic carbonate having no C=C unsaturated bond), ethyl methyl carbonate (EMC)(chain carbonate having no C=C unsaturated bond), and diethyl carbonate (DEC)(chain carbonate having no C=C unsaturated bond) in a molar ratio of 3:4:3 was used as the non-aqueous solvent.

$LiBF_4$ was dissolved as a boron-containing alkali salt in the solvent mixture, and $LiPF_6$ was further dissolved as a boron-free alkali salt.

Next, hydrogenated terphenyl, diphenyl ether, and vinylene carbonate were further added to the solvent mixture with the alkali salts dissolved therein. Therein, hydrogenated m-terphenyl of the following composition was used. The composition of the hydrogenated m-terphenyl was analyzed by gas chromatography.

Completely hydrogenated m-terphenyl: 0.1% by mass
1,3-dicyclohexyl benzene: 13.3% by mass
3-phenyl bicyclohexyl: 16.2% by mass
1,3-diphenyl cyclohexane: 23.1% by mass
m-cyclohexyl biphenyl: 43.6% by mass
m-terphenyl: 3.7% by mass In the non-aqueous electrolyte, the content of $LiBF_4$ was set to 0.35% by mass, the concentration of $LiPF_6$ to 1.0 M (mol/L), the content of hydrogenated m-terphenyl to 1.0% by mass, the content of diphenyl ether to 0.5% by mass, and the content of vinylene carbonate to 2.0% by mass.

(v) Production of Battery

Using the electrode assembly thus obtained, a prismatic lithium ion secondary battery illustrated in FIG. 1 was produced.

First, the electrode assembly with a lower insulator plate fitted to the lower end thereof was placed in a prismatic battery case made of an aluminum alloy with an alloy number of 3000 series. The aluminum alloy has a thickness of 0.4 mm and contains trace amounts of manganese and copper.

The negative electrode lead drawn from the electrode assembly was connected to the rivet positioned at the center of a seal plate through an upper insulator plate. The positive electrode lead drawn from the electrode assembly was connected to the back face of the seal plate through the upper insulator plate. Thereafter, the peripheral edge of the seal plate was fitted to the open edge of the battery case. The fitted portion was sealed by laser welding. The seal plate has a safety valve and an inlet. Next, 2.3 g of a predetermined non-aqueous electrolyte was injected from the inlet. The inlet was then closed with a seal stopper and sealed by laser welding. In this way, a prismatic lithium ion secondary battery of 34 mm in width, 5 mm in thickness, and 50 mm in total height having a battery capacity of 1000 mAh was completed.

The battery was charged at a constant current of 200 mA until the battery voltage reached 4.2 V and then discharged until the battery voltage reached 3.0 V, and this charge/discharge was repeated three times. Thereafter, the battery was further charged at a constant current of 200 mA for 20 minutes.

Example 2

A carbon composite (A) was prepared in the same conditions as those in Example 1 except that the particle circularity of the spherical natural graphite was changed from 0.92 to 0.91. Using the resulting carbon composite, a prismatic lithium ion secondary battery was produced in the same manner as in Example 1.

Table 1 shows the tap density, specific surface area, and mean particle size of the carbon composite measured in the above-described methods, the blend ratio of graphitic carbon substance (B) to carbon substance (C), and the heat-treatment condition. Table 1 also shows data of the following Examples and Comparative Examples.

Example 3

A carbon composite (A) was prepared in the same conditions as those in Example 1 except that the particle circularity of the spherical natural graphite was changed from 0.92 to 0.85. Using the resulting carbon composite, a prismatic lithium ion secondary battery was produced in the same manner as in Example 1.

Example 4

A carbon composite (A) was prepared in the same conditions as those in Example 1, except that the amount of the spherical natural graphite was changed from 95 parts by weight to 90 parts by weight, and that the amount of the non-graphitic organic material was changed from 5 parts by weight to 10 parts by weight. Using the resulting carbon composite, a prismatic lithium ion secondary battery was produced in the same manner as in Example 1.

Example 5

A carbon composite (A) was prepared in the same conditions as those in Example 1, except that the amount of the spherical natural graphite was changed from 95 parts by weight to 92 parts by weight, and that the amount of the non-graphitic organic material was changed from 5 parts by weight to 8 parts by weight. Using the resulting carbon composite, a prismatic lithium ion secondary battery was produced in the same manner as in Example 1.

Example 6

A carbon composite (A) was prepared in the same conditions as those in Example 1, except that the amount of the spherical natural graphite was changed from 95 parts by weight to 98 parts by weight, and that the amount of the non-graphitic organic material was changed from 5 parts by weight to 2 parts by weight. Using the resulting carbon composite, a prismatic lithium ion secondary battery was produced in the same manner as in Example 1.

Example 7

A carbon composite (A) was prepared in the same conditions as those in Example 1, except that the amount of the spherical natural graphite was changed from 95 parts by weight to 99 parts by weight, and that the amount of the non-graphitic organic material was changed from 5 parts by weight to 1 part by weight. Using the resulting carbon composite, a prismatic lithium ion secondary battery was produced in the same manner as in Example 1.

Example 8

A carbon composite (A) was prepared in the same conditions as those in Example 1 except that the mean particle size of the spherical natural graphite was changed from 19 μm to 9.1 μm. Using the resulting carbon composite, a prismatic lithium ion secondary battery was produced in the same manner as in Example 1.

Example 9

A carbon composite (A) was prepared in the same conditions as those in Example 1 except that the mean particle size of the spherical natural graphite was changed from 19 μm to 10.3 μm. Using the resulting carbon composite, a prismatic lithium ion secondary battery was produced in the same manner as in Example 1.

Example 10

A carbon composite (A) was prepared in the same conditions as those in Example 1 except that the mean particle size of the spherical natural graphite was changed from 19 μm to 30.1 μm. Using the resulting carbon composite, a prismatic lithium ion secondary battery was produced in the same manner as in Example 1.

Example 10

A carbon composite (A) was prepared in the same conditions as those in Example 1 except that the mean particle size of the spherical natural graphite was changed from 19 μm to 30.7 μm. Using the resulting carbon composite, a prismatic lithium ion secondary battery was produced in the same manner as in Example 1.

Example 12

A carbon composite (A) was prepared in the same conditions as those in Example 1, except that the amount of the spherical natural graphite was changed from 95 parts by weight to 4 parts by weight, and that the amount of the non-graphitic organic material was changed from 5 parts by weight to 96 parts by weight. Using the resulting carbon composite, a prismatic lithium ion secondary battery was produced in the same manner as in Example 1.

Example 13

A carbon composite (A) was prepared in the same conditions as those in Example 1, except that the amount of the spherical natural graphite was changed from 95 parts by weight to 5 parts by weight, and that the amount of the non-graphitic organic material was changed from 5 parts by weight to 95 parts by weight. Using the resulting carbon composite, a prismatic lithium ion secondary battery was produced in the same manner as in Example 1.

Example 14

A carbon composite (A) was prepared in the same conditions as those in Example 1, except that the amount of the spherical natural graphite was changed from 95 parts by weight to 99.9 parts by weight, and that the amount of the non-graphitic organic material was changed from 5 parts by weight to 0.1 part by weight. Using the resulting carbon composite, a prismatic lithium ion secondary battery was produced in the same manner as in Example 1.

Comparative Example 1

A carbon substance was prepared in the same conditions as those in Example 1, except that the amount of the spherical natural graphite was changed to 100 parts by weight, and that no non-graphitic organic material was used. Using the resulting carbon substance, a prismatic lithium ion secondary battery was produced in the same manner as in Example 1.

Example 15

A carbon composite was prepared by mixing 95 parts by weight of a product obtained by heat-treating the spherical natural graphite at 300° C. and 5 parts by weight of a product obtained by heat-treating the non-graphitic organic material at 300° C. Using the resulting carbon composite, a prismatic lithium ion secondary battery was produced in the same manner as in Example 1.

Example 16

A carbon composite (A) was prepared in the same conditions as those in Example 15, except that the heat treatment temperature of the spherical natural graphite and the heat treatment temperature of the non-graphitic organic material were changed from 300° C. to 650° C. Using the resulting carbon composite, a prismatic lithium ion secondary battery was produced in the same manner as in Example 1.

Example 17

A carbon composite (A) was prepared in the same conditions as those in Example 1, except that the heat treatment temperature was changed to 3400° C. Using the resulting carbon composite, a prismatic lithium ion secondary battery was produced in the same manner as in Example 1.

Example 18

A carbon composite (A) was prepared in the same conditions as those in Example 15, except that the spherical natural graphite was not heat-treated, and that the heat treatment temperature of the non-graphitic organic material was changed to 3000° C. Using the resulting carbon composite, a prismatic lithium ion secondary battery was produced in the same manner as in Example 1.

Comparative Example 2

A carbon composite (A) was prepared in the same conditions as those in Example 15, except that the heat treatment temperature of the spherical natural graphite was changed to 3000° C., and that the non-graphitic organic material was not heat-treated. Using the resulting carbon composite, a prismatic lithium ion secondary battery was produced in the same manner as in Example 1. This battery could not be evaluated since the negative electrode active material dissolved in the electrolyte and the negative electrode decomposed.

Example 19

A prismatic lithium ion secondary battery was produced in the same manner as in Example 1, except that the amount of the non-aqueous electrolyte injected into the battery case was changed to 1.8 g.

Comparative Example 3

A prismatic lithium ion secondary battery was produced in the same manner as in Comparative Example 1, except that the spherical natural graphite was not heat-treated.

Comparative Example 4

A prismatic lithium ion secondary battery was produced in the same manner as in Comparative Example 3, except that the amount of the non-aqueous electrolyte injected into the battery case was changed to 1.8 g.

Example 20

A prismatic lithium ion secondary battery was produced in the same manner as in Example 1, except that the content of the hydrogenated m-terphenyl in the non-aqueous electrolyte was changed to 0.2% by mass.

Example 21

A prismatic lithium ion secondary battery was produced in the same manner as in Example 1, except that the content of $LiBF_4$ in the non-aqueous electrolyte was changed to 0.10% by mass.

Example 22

A prismatic lithium ion secondary battery was produced in the same manner as in Example 1, except that the content of diphenyl ether in the non-aqueous electrolyte was changed to 0.05% by mass.

Example 23

A prismatic lithium ion secondary battery was produced in the same manner as in Example 1, except that the content of vinylene carbonate in the non-aqueous electrolyte was changed to 0.0% by mass.

Example 24

A prismatic lithium ion secondary battery was produced in the same manner as in Example 1, except that the content of diphenyl ether in the non-aqueous electrolyte was changed to 0.0% by mass.

Comparative Example 5

A prismatic lithium ion secondary battery was produced in the same manner as in Example 17, except that neither hydrogenated terphenyl nor diphenyl ether was added to the non-aqueous electrolyte.

Comparative Example 6

A prismatic lithium ion secondary battery was produced in the same manner as in Example 17, except that $LiBF_4$ was not added to the non-aqueous electrolyte.

Comparative Example 7

A prismatic lithium ion secondary battery was produced in the same manner as in Example 17, except that $LiPF_6$ was not added to the non-aqueous electrolyte, and that $LiBF_4$ was added at a concentration of 1.0 M.

TABLE 1

| | Negative electrode active material | | | | | |
|---|---|---|---|---|---|---|
| | Tap density (g/cm³) | Specific surface area (m²/g) | Mean particle size (μm) | Carbon substance (B) (mass %) | Carbon substance (C) (mass %) | Heat treatment temperature (° C.) |
| Example 1 | 1.1 | 3.5 | 19.8 | 95.0 | 5.0 | 3000 |
| Example 2 | 1.0 | 3.7 | 20.0 | 95.0 | 5.0 | 3000 |
| Example 3 | 0.8 | 2.9 | 20.1 | 95.0 | 5.0 | 3000 |
| Example 4 | 1.1 | 1.1 | 19.7 | 90.0 | 10.0 | 3000 |
| Example 5 | 1.2 | 1.2 | 20.0 | 92.0 | 8.0 | 3000 |
| Example 6 | 1.0 | 6.0 | 20.5 | 98.0 | 2.0 | 3000 |
| Example 7 | 1.0 | 6.1 | 20.7 | 99.0 | 1.0 | 3000 |
| Example 8 | 1.0 | 3.5 | 9.3 | 95.0 | 5.0 | 3000 |
| Example 9 | 1.1 | 3.4 | 10.6 | 95.0 | 5.0 | 3000 |
| Example 10 | 1.1 | 3.7 | 30.3 | 95.0 | 5.0 | 3000 |
| Example 11 | 1.0 | 3.5 | 31.1 | 95.0 | 5.0 | 3000 |
| Example 12 | 1.2 | 1.9 | 19.7 | 4.0 | 96.0 | 3000 |
| Example 13 | 1.2 | 2 | 19.9 | 5.0 | 95.0 | 3000 |
| Example 14 | 1.1 | 5.1 | 19.0 | 99.9 | 0.1 | 3000 |
| Comp. Ex. 1 | 1.1 | 5.3 | 19.1 | 100.0 | 0.0 | 3000 |
| Example 15 | 1.0 | 4.6 | 18.9 | 95.0 | 5.0 | 300 |
| Example 16 | 1.0 | 4 | 19.2 | 95.0 | 5.0 | 650 |
| Example 17 | 1.1 | 3.5 | 19.6 | 95.0 | 5.0 | 3400 |
| Example 18 | 1.2 | 5.7 | 18.7 | 95.0 | 5.0 | Only (C) 3000 |
| Comp. Ex. 2 | 1.0 | 5.4 | 18.9 | 95.0 | 5.0 | Only (B) 3000 |
| Example 19 | 1.1 | 3.5 | 19.8 | 95.0 | 5.0 | 3000 |
| Comp. Ex. 3 | 1.0 | 6.2 | 18.7 | 100.0 | 0.0 | Not heat-treated |
| Comp. Ex. 4 | 1.0 | 6.2 | 18.7 | 100.0 | 0.0 | Not heat-treated |
| Example 20 | 1.1 | 3.5 | 19.8 | 95.0 | 5.0 | 3000 |
| Example 21 | 1.1 | 3.5 | 19.8 | 95.0 | 5.0 | 3000 |
| Example 22 | 1.1 | 3.5 | 19.8 | 95.0 | 5.0 | 3000 |
| Example 23 | 1.1 | 3.5 | 19.8 | 95.0 | 5.0 | 3000 |
| Example 24 | 1.1 | 3.5 | 19.8 | 95.0 | 5.0 | 3000 |
| Comp. Ex. 5 | 1.1 | 3.5 | 19.6 | 95.0 | 5.0 | 3400 |
| Comp. Ex. 6 | 1.1 | 3.5 | 19.6 | 95.0 | 5.0 | 3400 |
| Comp. Ex. 7 | 1.1 | 3.5 | 19.6 | 95.0 | 5.0 | 3400 |

Table 2 shows the compositions of the non-aqueous electrolytes in Examples 1 to 24 and Comparative Examples 1 to 7.

TABLE 2

| | Composition of non-aqueous electrolyte | | | | | |
|---|---|---|---|---|---|---|
| | Hydrogenated terphenyl (mass %) | Diphenyl ether (mass %) | LiPF$_6$ (M) | LiBF$_4$ (mass %) | VC (mass %) | Amount of electrolyte (g) |
| Example 1 | 1.0 | 0.5 | 1.0 | 0.35 | 2 | 2.3 |
| Example 2 | 1.0 | 0.5 | 1.0 | 0.35 | 2 | 2.3 |
| Example 3 | 1.0 | 0.5 | 1.0 | 0.35 | 2 | 2.3 |
| Example 4 | 1.0 | 0.5 | 1.0 | 0.35 | 2 | 2.3 |
| Example 5 | 1.0 | 0.5 | 1.0 | 0.35 | 2 | 2.3 |
| Example 6 | 1.0 | 0.5 | 1.0 | 0.35 | 2 | 2.3 |
| Example 7 | 1.0 | 0.5 | 1.0 | 0.35 | 2 | 2.3 |
| Example 8 | 1.0 | 0.5 | 1.0 | 0.35 | 2 | 2.3 |
| Example 9 | 1.0 | 0.5 | 1.0 | 0.35 | 2 | 2.3 |
| Example 10 | 1.0 | 0.5 | 1.0 | 0.35 | 2 | 2.3 |
| Example 11 | 1.0 | 0.5 | 1.0 | 0.35 | 2 | 2.3 |
| Example 12 | 1.0 | 0.5 | 1.0 | 0.35 | 2 | 2.3 |
| Example 13 | 1.0 | 0.5 | 1.0 | 0.35 | 2 | 2.3 |
| Example 14 | 1.0 | 0.5 | 1.0 | 0.35 | 2 | 2.3 |
| Comp. Ex. 1 | 1.0 | 0.5 | 1.0 | 0.35 | 2 | 2.3 |
| Example 15 | 1.0 | 0.5 | 1.0 | 0.35 | 2 | 2.3 |
| Example 16 | 1.0 | 0.5 | 1.0 | 0.35 | 2 | 2.3 |
| Example 17 | 1.0 | 0.5 | 1.0 | 0.35 | 2 | 2.3 |
| Example 18 | 1.0 | 0.5 | 1.0 | 0.35 | 2 | 2.3 |
| Comp. Ex. 2 | 1.0 | 0.5 | 1.0 | 0.35 | 2 | 2.3 |
| Example 19 | 1.0 | 0.5 | 1.0 | 0.35 | 2 | 1.8 |
| Comp. Ex. 3 | 1.0 | 0.5 | 1.0 | 0.35 | 2 | 2.3 |
| Comp. Ex. 4 | 1.0 | 0.5 | 1.0 | 0.35 | 2 | 1.8 |
| Example 20 | 0.2 | 0.5 | 1.0 | 0.35 | 2 | 2.3 |
| Example 21 | 1.0 | 0.5 | 1.0 | 0.10 | 2 | 2.3 |

TABLE 2-continued

|  | Composition of non-aqueous electrolyte | | | | | |
|---|---|---|---|---|---|---|
|  | Hydrogenated terphenyl (mass %) | Diphenyl ether (mass %) | LiPF$_6$ (M) | LiBF$_4$ (mass %) | VC (mass %) | Amount of electrolyte (g) |
| Example 22 | 1.0 | 0.05 | 1.0 | 0.35 | 2 | 2.3 |
| Example 23 | 1.0 | 0.5 | 1.0 | 0.35 | — | 2.3 |
| Example 24 | 1.0 | 0 | 1.0 | 0.35 | 2 | 2.3 |
| Comp. Ex. 5 | 0.0 | 0 | 1.0 | 0.35 | 2 | 2.3 |
| Comp. Ex. 6 | 1.0 | 0.5 | 1.0 | 0 | 2 | 2.3 |
| Comp. Ex. 7 | 1.0 | 0.5 | 0.0 (1.0 M) | 2 | 2.3 | |

<Evaluation>

For each of the batteries of Examples 1 to 24 and Comparative Examples 1 to 7, 10 cells were prepared and tested for their charge/discharge cycle characteristic, high-temperature storage characteristic, and overcharge characteristic. Table 3 shows the results. The test conditions are described below.

[Charge/Discharge Cycle Characteristic]

The charge/discharge cycle of the following (a) to (d) was repeated:

(a) charging each battery at a constant current of 1000 mA (1.0 ItA, 1 hour-rate) in a 60° C. environment until the battery voltage reaches 4.2 V;

(b) thereafter charging the battery at the constant voltage of 4.2 V until the current value decreases to 50.0 mA (0.05 ItA, 20 hour-rate);

(c) thereafter allowing the battery to stand for 10 minutes; and (d) thereafter discharging the battery at a constant current of 1000 mA (1.0 ItA, 1 hour-rate) until the battery voltage reaches 3.0 V.

The battery capacity was measured after the 1$^{st}$ cycle and the 200$^{th}$ cycle. The percentage of the 200$^{th}$ cycle battery capacity relative to the 1$^{st}$ cycle battery capacity was calculated. The average value of 10 batteries was obtained, and this average value was used as the "capacity retention rate".

[High-Temperature Storage Characteristic]

First, before high-temperature storage, each battery was subjected to the following steps (e) to (h), and the battery capacity before storage was measured:

(e) charging each battery at a constant current of 1000 mA (1.0 ItA, 1 hour-rate) in a 20° C. environment until the battery voltage reaches 4.2 V;

(f) thereafter charging the battery at the constant voltage of 4.2 V until the current value decreases to 50.0 mA (0.05 ItA, 20 hour-rate);

(g) thereafter allowing the battery to stand for 10 minutes; and (h) thereafter discharging the battery at a constant current of 1000 mA (1.0 ItA, 1 hour-rate) until the battery voltage reaches 3.0 V.

Next, the battery was charged at a constant current of 1000 mA (1.0 ItA, 1 hour-rate) until the battery voltage reached 4.2 V.

Thereafter, the battery was charged at the constant voltage of 4.2 V until the current value decreased to 50.0 mA (0.05 ItA, 20 hour-rate), so that the battery was fully charged.

The fully charged battery was stored in a 60° C. atmosphere for 14 days.

After the storage, the remaining capacity of the battery was discharged at a constant current of 1000 mA (1.0 ItA, 1 hour-rate) in a 20° C. environment until the battery voltage reached 3.0 V.

Next, after the storage, the battery was subjected to the above steps (e) to (h), and the battery capacity after the storage was measured. The percentage of the battery capacity after the storage relative to the battery capacity before the storage was calculated. The average value of 10 batteries was obtained, and this average value was used as the "capacity recovery rate".

[Overcharge Test]

In a 20° C. environment, each battery was discharged at a constant current of 1000 mA (1.0 ItA, 1 hour-rate) until the battery voltage reached 3.0 V. It was then continuously charged at the constant current of 1000 mA (1.0 ItA, 1 hour-rate), and the charge was stopped when the temperature of the battery surface reached 105° C. or 110° C. After the stop of the charge, the battery was checked to find whether or not it overheated. When the temperature of the battery surface reached 120° C. or more, the battery was determined to be a overheated battery. Table 3 shows the number n (n/10) of overheated batteries.

TABLE 3

| | Charge/discharge cycle characteristic Capacity retention rate (%) | High-temperature storage characteristic Capacity recovery rate (%) | Overcharge test | |
|---|---|---|---|---|
| | | | Number of overheated batteries due to overcharge to 105° C. | Number of overheated batteries due to overcharge to 110° C. |
| Example 1 | 95 | 89 | 0/10 | 0/10 |
| Example 2 | 95 | 89 | 0/10 | 0/10 |
| Example 3 | 90 | 88 | 0/10 | 0/10 |
| Example 4 | 88 | 86 | 0/10 | 0/10 |
| Example 5 | 91 | 87 | 0/10 | 0/10 |
| Example 6 | 96 | 88 | 0/10 | 1/10 |
| Example 7 | 96 | 87 | 0/10 | 3/10 |
| Example 8 | 93 | 87 | 0/10 | 0/10 |
| Example 9 | 95 | 88 | 0/10 | 0/10 |

TABLE 3-continued

|  | Charge/discharge cycle characteristic Capacity retention rate (%) | High-temperature storage characteristic Capacity recovery rate (%) | Overcharge test | |
|---|---|---|---|---|
|  |  |  | Number of overheated batteries due to overcharge to 105° C. | Number of overheated batteries due to overcharge to 110° C. |
| Example 10 | 91 | 87 | 0/10 | 0/10 |
| Example 11 | 88 | 86 | 0/10 | 0/10 |
| Example 12 | 86 | 87 | 0/10 | 0/10 |
| Example 13 | 90 | 88 | 0/10 | 0/10 |
| Example 14 | 93 | 88 | 0/10 | 0/10 |
| Comp. Ex. 1 | 88 | 86 | 0/10 | 0/10 |
| Example 15 | 76 | 72 | 0/10 | 0/10 |
| Example 16 | 91 | 84 | 0/10 | 0/10 |
| Example 17 | 95 | 89 | 0/10 | 0/10 |
| Example 18 | 88 | 86 | 0/10 | 0/10 |
| Comp. Ex. 2 | Evaluation was not possible | | | |
| Example 19 | 90 | 89 | 0/10 | 0/10 |
| Comp. Ex. 3 | 84 | 80 | 0/10 | 0/10 |
| Comp. Ex. 4 | 75 | 79 | 0/10 | 0/10 |
| Example 20 | 95 | 89 | 2/10 | 4/10 |
| Example 21 | 91 | 81 | 0/10 | 0/10 |
| Example 22 | 92 | 82 | 0/10 | 3/10 |
| Example 23 | 90 | 84 | 0/10 | 0/10 |
| Example 24 | 93 | 87 | 0/10 | 1/10 |
| Comp. Ex. 5 | 94 | 89 | 4/10 | 10/10 |
| Comp. Ex. 6 | 82 | 75 | 0/10 | 0/10 |
| Comp. Ex. 7 | 75 | 82 | 0/10 | 0/10 |

The results of Table 3 indicate that the non-aqueous electrolyte secondary batteries of the present invention are excellent in high-temperature (60° C.) charge/discharge cycle characteristic and high-temperature (60° C.) storage characteristic, and also excellent in safety during overcharge. This is probably because the non-aqueous electrolyte contains hydrogenated terphenyl, diphenyl ether, and a boron-containing alkali salt, and the negative electrode active material comprises a randomly oriented carbon composite.

Examples 1 to 3 show that the preferable tap density of the randomly oriented carbon composite is 1.0 g/cm$^3$ or more, and that at 0.8 g/cm$^3$, the capacity retention rate tends to lower.

Examples 4 to 7 demonstrate that the preferable specific surface area of the randomly oriented carbon composite is 1.2 m$^2$/g or more and 6 m$^2$/g or less. Also, Example 4 shows that when the specific surface area is 1.1 m$^2$/g, the capacity retention rate slightly lowers. Example 7 demonstrates that at 6.1 m$^2$/g, safety during overcharge deteriorates slightly.

Examples 8 to 11 indicate that the preferable mean particle size of the randomly oriented carbon composite is 10 μm or more and 30 μm or less. Also, Example 8 shows that when the mean particle size is 9.3 μm, the capacity retention rate lowers slightly. Example 11 demonstrates that when the mean particle size is 31 μm, the capacity retention rate lowers slightly.

Examples 12 to 14 and Comparative Example 1 indicate that the preferable content of the graphitic carbon substance (B) in the randomly oriented carbon composite is 5 to 99.9% by mass.

Examples 15 to 18 and Comparative Examples 2 and 3 indicate that the preferable heat treatment temperature is 650° C. or more and 3400° C. or less. They also indicate that the heat treatment of the graphitic carbon substance (B) and/or carbon substance (C) constituting the randomly oriented carbon composite at appropriate temperatures provides preferable results.

Comparative Example 1, Example 19, Comparative Example 3, and Comparative Example 4 show that the heat treatment of the spherical natural graphite results in a small decrease in capacity retention rate even when the amount of the non-aqueous electrolyte is small.

Example 1 and Example 23 demonstrate that the addition of vinylene carbonate (VC) to the non-aqueous electrolyte containing hydrogenated terphenyl, diphenyl ether, and a boron-containing alkali salt significantly improves the charge/discharge cycle characteristic and high-temperature storage characteristic.

Example 1 and Example 24 indicate that the addition of diphenyl ether to the non-aqueous electrolyte containing hydrogenated terphenyl and a boron-containing alkali salt significantly improves the charge/discharge cycle characteristic, high-temperature storage characteristic, and safety during overcharge.

Example 17 and Comparative Examples 1, 5, 6, and 7 show that the inclusion of hydrogenated terphenyl, a randomly oriented carbon composite, a boron-containing alkali salt, and a boron-free alkali salt in the non-aqueous electrolyte produces a synergistic effect, thereby providing a good balance between charge/discharge cycle characteristic, high-temperature storage characteristic, and safety during overcharge.

Further, the positive electrode active material was changed from LiCoO$_2$ to lithium nickelate (LiNiO$_2$), lithium manganate (LiMn$_2$O$_4$), and various modified substances thereof with part of their transition metal replaced with another metal, and batteries were produced in the same manner as in Example 1. As a result, it was confirmed that the present invention is effective regardless of the kind of the positive electrode active material.

INDUSTRIAL APPLICABILITY

The non-aqueous electrolyte secondary battery of the present invention is applicable to batteries of any shape such as a coin, button, sheet, cylindrical, flat, or prismatic shape. The form of the electrode plate assembly composed of a positive electrode, a negative electrode, and a separator is not limited. The present invention is also applicable to batteries of both wound type and layered type. The battery size is not limited either. The present invention is applicable to small, medium, and large size batteries.

The non-aqueous electrolyte secondary battery of the present invention is particularly useful as the power source for driving consumer electronics (e.g., personal digital assistants, portable electronics, portable appliances, cordless appliances, etc.) that are required to provide high reliability in charge/discharge cycle characteristic, high-temperature storage characteristic, and safety during overcharge. The non-aqueous electrolyte secondary battery of the present invention is also useful as the power source for compact power storage devices for home use, two-wheel motor vehicles, electric vehicles, hybrid electric vehicles, etc.

The invention claimed is:

1. A non-aqueous electrolyte secondary battery comprising a positive electrode, a negative electrode, and a non-aqueous electrolyte,
    wherein said non-aqueous electrolyte comprises a non-aqueous solvent, a solute dissolved in said non-aqueous solvent, and hydrogenated terphenyl,
    said solute comprises a boron-containing alkali salt and a boron-free alkali salt, said non-aqueous electrolyte contains 0.1% by mass to 1% by mass of diphenyl ether,
    said non-aqueous electrolyte contains 0.5% by mass to 3.5% by mass of the hydrogenated terphenyl and 0.1% by mass to 0.5% by mass of the boron-containing alkali salt,
    said negative electrode includes a negative electrode active material comprising a randomly oriented carbon composite A, and
    said carbon composite A contains a graphitic carbon substance B and a carbon substance C that is different from said graphitic carbon substance B, said graphitic carbon substance B being a product obtained by applying a heat treatment to a spherical natural graphite at a temperature of 650 to 3000° C.

2. The non-aqueous electrolyte secondary battery in accordance with claim 1, wherein said carbon substance C is a product obtained by applying a heat treatment to a non-graphitic organic material.

3. The non-aqueous electrolyte secondary battery in accordance with claim 1, wherein the content of the graphitic carbon substance B in said carbon composite A is 5% by mass or more and 99.9% by mass or less.

4. The non-aqueous electrolyte secondary battery in accordance with claim 1, wherein the content of the carbon substance C in said carbon composite A is 0.1% by mass or more.

5. The non-aqueous electrolyte secondary battery in accordance with claim 2, wherein the heat treatment of said non-graphitic organic material is performed at a temperature of 650 to 3400° C.

6. The non-aqueous electrolyte secondary battery in accordance with claim 1, wherein said carbon composite A has a tap density of 1.0 g/cm$^3$ or more.

7. The non-aqueous electrolyte secondary battery in accordance with claim 1, wherein said carbon composite A has a specific surface area of 1.2 m$^2$/g or more and 6 m$^2$/g or less.

8. The non-aqueous electrolyte secondary battery in accordance with claim 1, wherein said carbon composite A has a volume basis mean particle size of 10 μm or more and 30 μm or less.

9. The non-aqueous electrolyte secondary battery in accordance with claim 1, wherein said non-aqueous electrolyte contains 0.8% by mass to 2.5% by mass of the hydrogenated terphenyl.

10. The non-aqueous electrolyte secondary battery in accordance with claim 1, wherein said non-aqueous electrolyte contains 1% by mass to 1.5% by mass of the hydrogenated terphenyl.

11. The non-aqueous electrolyte secondary battery in accordance with claim 1, wherein said non-aqueous electrolyte contains 0.2% by mass to 0.8% by mass of the diphenyl ether.

12. The non-aqueous electrolyte secondary battery in accordance with claim 1, wherein said spherical natural graphite has a particle circularity of 0.85 to 1.

13. The non-aqueous electrolyte secondary battery in accordance with claim 1, wherein said spherical natural graphite has a particle circularity of 0.9 to 0.95.

* * * * *